United States Patent
Chu et al.

(10) Patent No.: US 8,259,065 B2
(45) Date of Patent: Sep. 4, 2012

(54) TILT-WHEEL MOUSE CIRCUIT

(75) Inventors: Chi-Chun Chu, Hsinchu (TW); Yung-Chih Chen, Taipei (TW)

(73) Assignee: Sunplus Innovation Technology Inc., Hsinchu (TW)

( * ) Notice: Subject to any disclaimer, the term of this patent is extended or adjusted under 35 U.S.C. 154(b) by 1014 days.

(21) Appl. No.: 12/237,921

(22) Filed: Sep. 25, 2008

(65) Prior Publication Data

US 2009/0085872 A1      Apr. 2, 2009

(30) Foreign Application Priority Data

Sep. 27, 2007   (TW) ................................ 96135954 A

(51) Int. Cl.
*G06F 3/033* (2006.01)
*H03M 11/00* (2006.01)
(52) U.S. Cl. .......................................... 345/163; 341/20
(58) Field of Classification Search .................. None
See application file for complete search history.

(56) References Cited

U.S. PATENT DOCUMENTS

| | | | |
|---|---|---|---|
| 3,576,569 A * | 4/1971 | Watson | 341/25 |
| 3,761,918 A * | 9/1973 | Hatano et al. | 341/24 |
| 3,818,441 A * | 6/1974 | Nomiya et al. | 714/813 |
| 4,502,416 A * | 3/1985 | Keysell et al. | 119/51.11 |
| 4,736,113 A * | 4/1988 | Leu | 307/10.5 |
| 2003/0012368 A1* | 1/2003 | Smallwood | 379/433.07 |
| 2008/0192010 A1* | 8/2008 | Lin | 345/163 |

FOREIGN PATENT DOCUMENTS

TW            233044            5/2005

* cited by examiner

*Primary Examiner* — Bipin Shalwala
*Assistant Examiner* — Daniel Bedell
(74) *Attorney, Agent, or Firm* — WPAT, PC; Justin King

(57) ABSTRACT

A tilt-wheel mouse circuit is provided. Without adding more I/O pins, the tilt-wheel mouse circuit provides extra scrolling-left and scrolling-right functions through an external-extend circuit and firmware of a micro-controller within the tilt-wheel mouse circuit. It follows that the cost of the manufacturing of the tilt-wheel mouse is accordingly low and the package size of the micro-controller is accordingly small.

9 Claims, 3 Drawing Sheets

TILT-WHEEL MOUSE CIRCUIT

FIELD OF THE INVENTION

The present invention relates to a tilt-wheel mouse circuit, and more particularly to a tilt-wheel mouse circuit having extra scrolling-left and scrolling-right functions without adding more I/O pins of a micro-controller within the tilt-wheel mouse circuit.

BACKGROUND OF THE INVENTION

A mouse is a must-have item on any computers. When the mouse is moved across a desktop, the mouse cursor on the display moves accordingly. The mouse cursor can be pointed anywhere on the screen, or be used to scroll a selected window.

The early mouse has only three buttons. It follows that users can only vertically or horizontally scroll the selected window through pointing the mouse cursor to the vertical or horizontal scrollbar. The modern mouse has a scroll-wheel. When users rotate up or down the scroll-wheel, the selected window is scrolled up or down accordingly. However, users still need to point the mouse cursor to the horizontal scrollbar if they want to horizontally scroll the selected window. According to the sensor, the wheel-mouse can be categorized to an optical mouse and a laser mouse, and the laser mouse is much surface-independent than the optical mouse.

FIG. 1A is a diagram showing a wheel-mouse in prior art. The wheel-mouse 10 consists of: a left-button 12, a middle-button 14, a right-button 16, and a scroll-wheel 18. When users press the left-button 12, a left-button-pressed signal is derived and outputted from the wheel-mouse 10 to a host; when users press the middle-button 14, a middle-button-pressed signal is derived and outputted from the wheel-mouse 10 to the host; when users press the right-button 16, a right-button-pressed signal is derived and outputted from the wheel-mouse 10 to the host. Moreover, when users rotate up the scroll-wheel 18, a scrolling-up signal is derived and outputted from the wheel-mouse 10 to the host; when users rotate down the scroll-wheel 18, a scrolling-down signal is derived and outputted from the wheel-mouse 10 to the host.

FIG. 1B is a schematic diagram showing the circuit configuration of the prior-art wheel-mouse depicted in FIG. 1A. The wheel-mouse circuit consists of: a micro-controller 20 (MCU), a left-middle-right button unit 22, and a vertical-scrolling wheel unit 24. The micro-controller 20 (MCU) further consists of: three I/O pins, that is, a left-button signal input terminal 202, a middle-button signal input terminal 204, and a right-button signal input terminal 206. The left-middle-right button unit 22 further consists of: a left-button switch (LB), a middle-button switch (MB), and a right-button switch (RB). The three I/O pins of the micro-controller 20 (MCU), that is the left-button signal input terminal 202, the middle-button signal input terminal 204, and the right-button signal input terminal 206, are connected to a supply power (Vcc) through the left-button switch (LB), the middle-button switch (MB), and the right-button switch (RB), respectively. Moreover, the vertical-scrolling wheel unit 24 is connected to the micro-controller 20 (MCU).

As depicted in FIG. 1B, when users press a left-button of a wheel-mouse, the left-button switch (LB) is at close position (ON), the middle-button switch (MB) and the right-button switch (RB) are at open position (OFF). It follows that a high-level signal, derived from the supply power (Vcc), is outputted to the left-button signal input terminal 202, a low-level signal is outputted to the middle-button signal input terminal 204 and the right-button signal input terminal 206 of the micro-controller 20 (MCU). According to the level of the signals received by the left-button signal input terminal 202, the middle-button signal input terminal 204, and the right-button signal input terminal 206, that is (1,0,0), the micro-controller 20 (MCU) outputs the left-button-pressed signal to the host. Similarly, when users press a middle-button of a wheel-mouse, the middle-button switch (MB) is at close position (ON), the left-button switch (LB) and the right-button switch (RB) are at open position (OFF). It follows that a high-level signal, derived from the supply power (Vcc), is outputted to the middle-button signal input terminal 204, a low-level signal is outputted to the left-button signal input terminal 202 and the right-button signal input terminal 206 of the micro-controller 20 (MCU). According to the level of the signals received by the left-button signal input terminal 202, the middle-button signal input terminal 204, and the right-button signal input terminal 206, that is (0,1,0), the micro-controller 20 (MCU) outputs the middle-button-pressed signal to the host. Similarly, when users press a right-button of a wheel-mouse, the right-button switch (RB) is at close position (ON), the left-button switch (LB) and the middle-button switch (MB) are at open position (OFF). It follows that a high-level signal, derived from the supply power (Vcc), is outputted to the right-button signal input terminal 206, a low-level signal is outputted to the left-button signal input terminal 202 and the middle-button signal input terminal 204 of the micro-controller 20 (MCU). According to the level of the signals received by the left-button signal input terminal 202, the middle-button signal input terminal 204, and the right-button signal input terminal 206, that is (0,0,1), the micro-controller 20 (MCU) outputs the right-button-pressed signal to the host. Moreover, the micro-controller 20 (MCU) can output a scrolling-up signal and a scrolling-down signal to the host according to the signals outputted from the vertical-scrolling wheel unit 24.

Conventionally, the scroll-wheel is designed for scrolling up or scrolling down a selected window. In 2003, Microsoft submitted a tilt-wheel mouse. Not only provide the scrolling-up and scrolling-down functions, the tilt-wheel mouse also provides the scrolling-left and the scrolling-right functions. That is, when the tilt-wheel is used left tilt, the selected window will be scrolled left, and when the tilt-wheel is used right tilt, the selected window will be scrolled right.

FIG. 2A is a diagram showing a tilt-wheel mouse in prior art. The tilt-wheel mouse 30 consists of: a left-button 32, a middle-button 34, a right-button 36, and a tilt-wheel 38. The tilt-wheel mouse 30 is an essentially conventional wheel-mouse except the tilt-wheel mouse 30 outputs a scrolling-left signal to the host when users left tilts the tilt-wheel 38; and the tilt-wheel mouse 30 outputs a scrolling-right signal to the host when users right tilts the tilt-wheel 38.

FIG. 2B is a schematic diagram showing the circuit configuration of the prior-art tilt-wheel mouse depicted in FIG. 2A. The tilt-wheel mouse circuit consists of: a micro-controller 40 (MCU), the left-middle-right button unit 22, the vertical-scrolling wheel unit 24, and a horizontal-scrolling button unit 42. The horizontal-scrolling button unit 42 further consists of: a left-tilt-button switch (LTB) and a right-tilt-button switch (RTB), where the left-tilt-button switch (LTB) will be triggered when users left tilt the tilt-wheel, and the right-tilt-button switch (RTB) will be triggered when users right tilt the tilt-wheel. Compared to the micro controller 20 (MCU) depicted in FIG. 2B, the micro-controller 40 (MCU) has another two I/O pins, that is a left-tilt signal input terminal 402 and a right-tilt signal input terminal 404. The left-tilt signal input terminal 402 and the right-tilt signal input terminal 404 are connected to a supply power (Vcc) through the left-tilt-button switch (LTB) and the right-tilt-button switch (RTB), respectively.

As depicted in FIG. 2B, when users left tilt a tile-wheel of a tilt-wheel mouse, the left-tilt-button switch (LTB) is at close position (ON) and the right-tilt-button switch (RTB) is at open position (OFF). It follows that a high-level signal, derived from the supply power (Vcc), is outputted to the left-tilt signal input terminal 402, and a low-level signal is outputted to the right-tilt signal input terminal 404 of the micro-controller 40 (MCU). According to the level of the signals received by the left-tilt signal input terminal 402 and the right-tilt signal input terminal 404, that is (1,0), the micro-controller 40 (MCU) outputs a scrolling-left signal to the host. Similarly, when users right tilt a tile-wheel of a tilt-wheel mouse, the right-tilt-button switch (RTB) is at close position (ON) and the left-tilt-button switch (LTB) is at open position (OFF). It follows that a high-level signal, derived from the supply power (Vcc), is outputted to the right-tilt signal input terminal 404, and a low-level signal is outputted to the left-tilt signal input terminal 402 of the micro-controller 40 (MCU). According to the level of the signals received by the left-tilt signal input terminal 402 and the right-tilt signal input terminal 404, that is (0,1), the micro-controller 40 (MCU) outputs a scrolling-right signal to the host.

Obviously, for providing the extra functions of scrolling-left and scrolling-right in a conventional tilt-wheel mouse, another two I/O pins, that is the left-tilt signal input terminal 402 and the right-tilt signal input terminal 404, must be implemented in the micro-controller 40. It results in a relatively high manufacturing cost and a relatively large package size of the micro-controller 40 (MCU).

SUMMARY OF THE INVENTION

Therefore, without adding more I/O pins, the present invention of the tilt-wheel circuit provides extra scrolling-left and scrolling-right functions through an external-extend circuit and firmware of a micro-controller within the tilt-wheel mouse circuit.

The present invention discloses a tilt-wheel mouse circuit, comprising: a micro-controller, having a first input terminal, a second input terminal, and a third input terminal, for outputting a first-button-pressed signal, a second-button-pressed signal, a third-button-pressed signal, a scrolling-left signal, and a scrolling-right signal according to the level of signals at the first input terminal, the second input terminal, and the third input terminal; a button unit, having a first-button switch, a second-button switch, and a third-button switch connected to the first input terminal, the second input terminal, the third input terminal respectively, for outputting a first-level signal or a second-level signal to the first input terminal, the second input terminal, the third input terminal, respectively; a horizontal-scrolling button unit, having a first horizontal-scrolling switch and a second horizontal-scrolling switch, for outputting the first-level signal or the second-level signal; and, an external-extend circuit, connected to the micro-controller and the horizontal-scrolling button unit, wherein the external-extend circuit can transmit the first-level signal or the second-level signal, derived from the first horizontal-scrolling switch, to the first input terminal and the second input terminal within an effective-duration; and the external-extend can transmit the first-level signal or the second-level signal, derived from the second horizontal-scrolling switch, to the second input terminal and the third input terminal within the effective-duration; wherein, the micro-controller is capable of outputting the scrolling-left signal when the first-level signal is asserted at the first input terminal and the second input terminal, and the second-level signal is asserted at the third input terminal, where a time difference, between the two time points of the first-level signal asserted at the first input terminal and the second input terminal, is less than the effective-duration; the micro-controller is capable of outputting the scrolling-right signal when the second-level signal is asserted at the first input terminal, and the first-level signal is asserted at the second input terminal and the third input terminal, where a time difference, between the two time points of the first-level signal asserted at the second input terminal and the third input terminal, is less than the effective-duration.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention is a tilt-wheel mouse circuit. Without adding more I/O pins, the present invention of the tilt-wheel circuit provides extra scrolling-left and scrolling-right functions through an external-extend circuit and firmware of a micro-controller within the tilt-wheel mouse circuit.

Figure 1A:
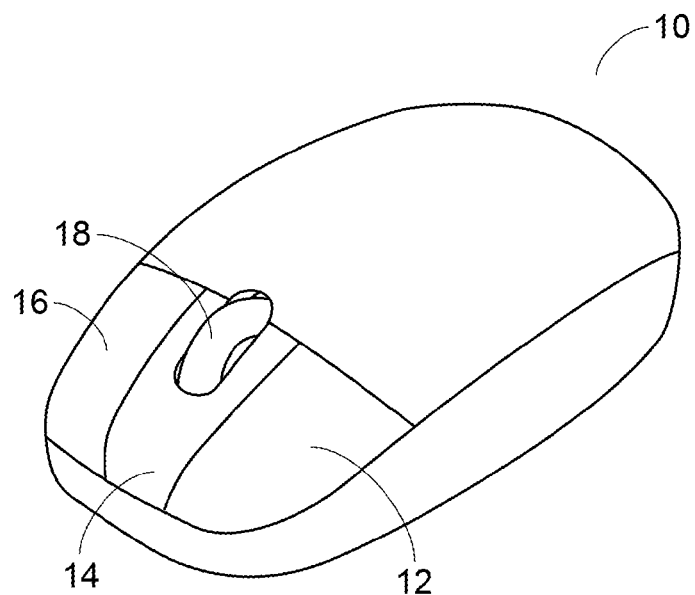
FIG. 1A is a diagram showing a wheel-mouse in prior art.
Figure 1B:
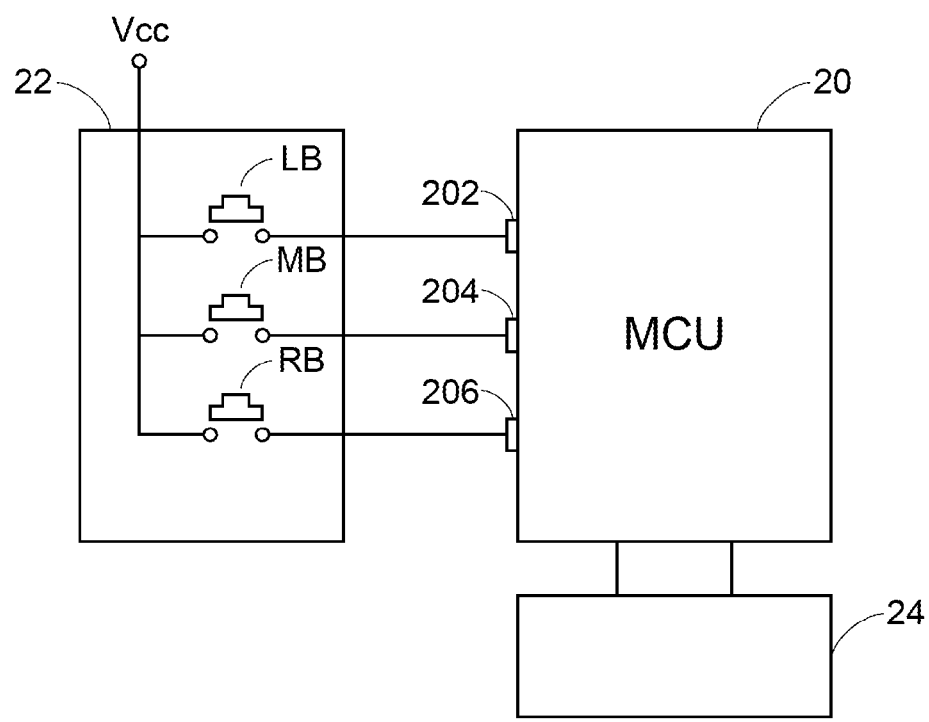
FIG. 1B is a schematic diagram showing the circuit configuration of the prior-art wheel-mouse depicted in FIG. 1A.
Figure 2A:
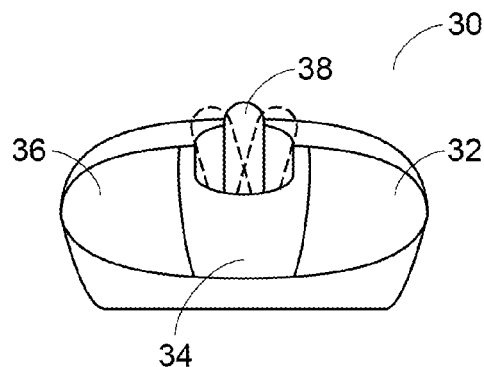
FIG. 2A is a diagram showing a tilt-wheel mouse in prior art.
Figure 2B:
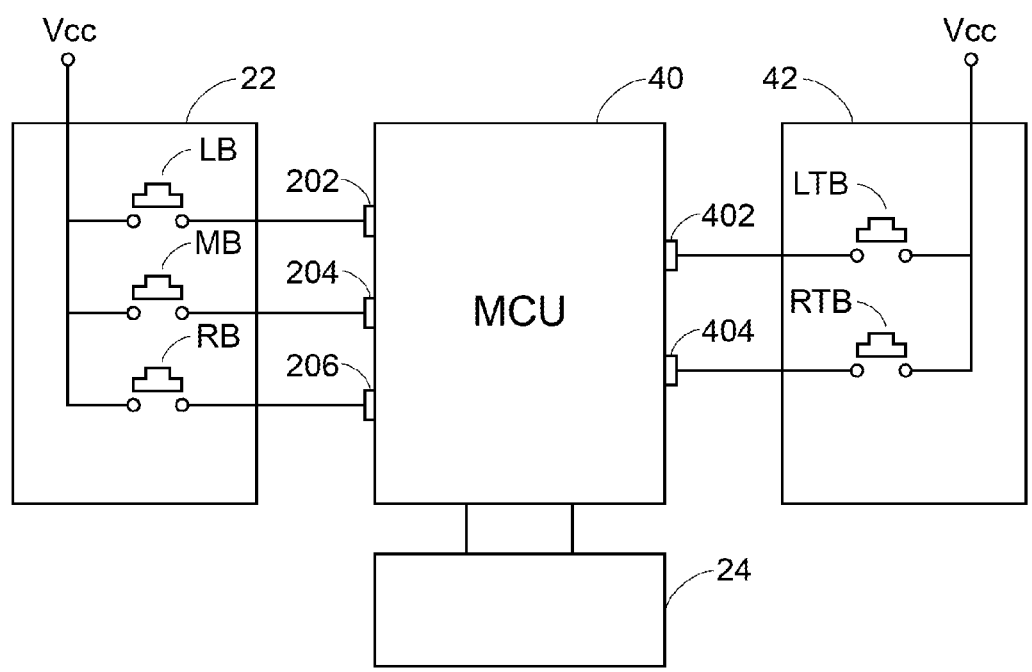
FIG. 2B is a schematic diagram showing the circuit configuration of the prior-art tilt-wheel mouse depicted in FIG. 2A.
Figure 3:
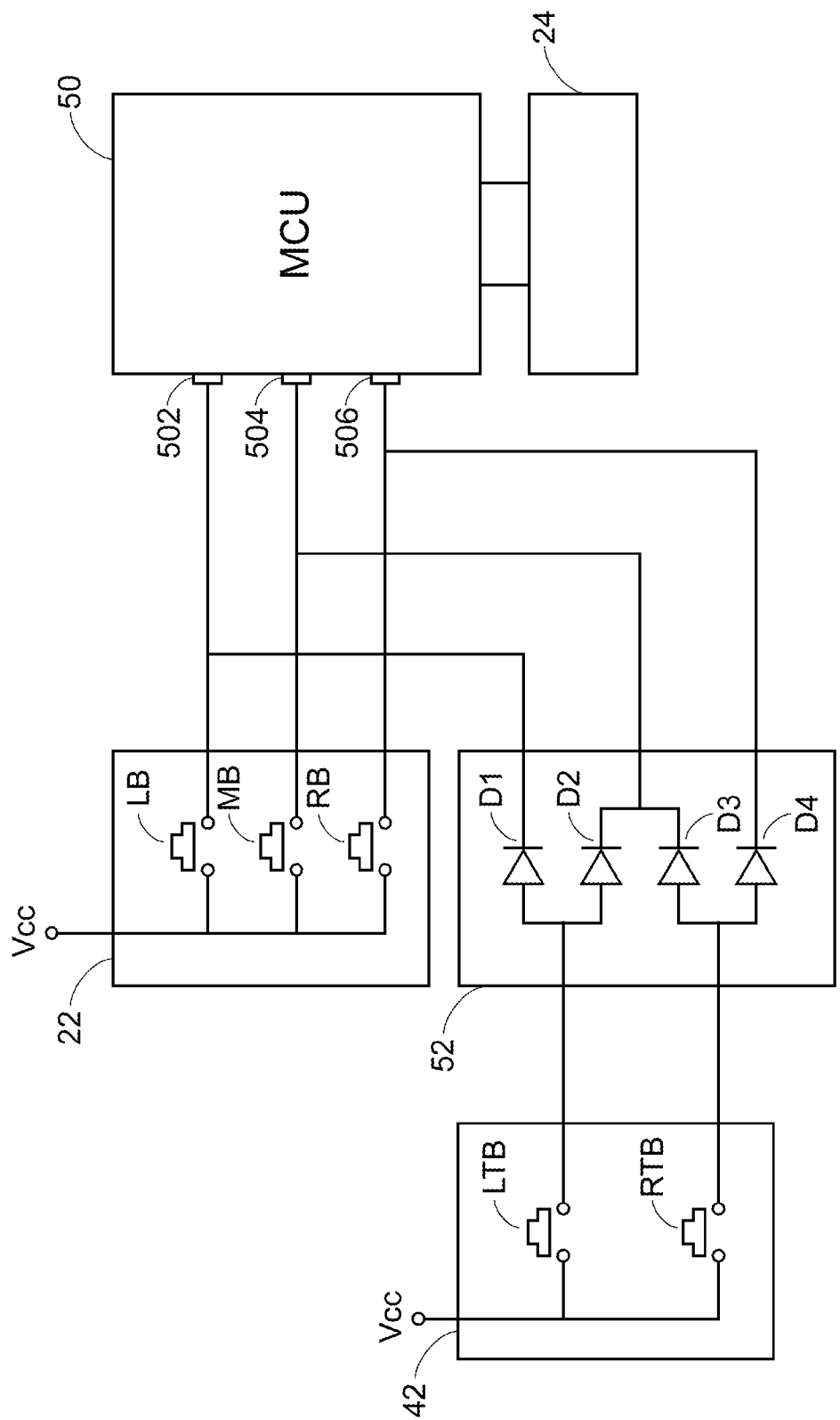
FIG. 3 is a schematic diagram showing the circuit configuration of a tilt-wheel mouse of the present invention.

FIG. 3 is a schematic diagram showing the circuit configuration of a tilt-wheel mouse of the present invention. The tilt-wheel mouse consists of: a micro-controller 50 (MCU), the left-middle-right button unit 22, the vertical-scrolling wheel unit 24, the horizontal-scrolling button unit 42, and an external-extend circuit 52. The micro-controller 50 further consists of three I/O pins, that is a left-button signal input terminal 502, a middle-button signal input terminal 504, and a right-button signal input terminal 506. The left-button signal input terminal 502, the middle-button signal input terminal 504, and the right-button signal input terminal 506 are connected to a supply power (Vcc) through the left-button switch (LB), the middle-button switch (MB), and the right-button switch (RB), respectively. The external-extend circuit 52 further consists of: four diodes D1, D2, D3, and D4. The P terminals of the diodes D1 and D2 are together connected to the supply power (Vcc) through the left-tilt-button switch (LTB) in the horizontal-scrolling button unit 42; the N terminals of the diodes D1 and D2 are connected to the left-button signal input terminal 502 and the middle-button signal input terminal 504, respectively; the P terminals of the diodes D3 and D4 are together connected to the supply power (Vcc) through the right-tilt-button switch (RTB) in the horizontal-scrolling button unit 42; the N terminals of the diodes D3 and D4 are connected to the middle-button signal input terminal 504 and the right-button signal input terminal 506, respectively.

As depicted in FIG. 3, when a tile-wheel of a tilt-wheel mouse is tilted left by the user, the left-tilt-button switch (LTB) is at close position (ON) and the right-tilt-button switch (RTB) is at open position (OFF). It follows that a high-level signal, derived from the supply power (Vcc), is outputted to the left-button signal input terminal 502 and the middle-button signal input terminal 504 through the diodes D1 and D2, respectively, and a low-level signal is outputted to the right-button signal input terminal 506 through the diode D4. According to the level of the signals received by the left-button signal input terminal 502, the middle-button signal input terminal 504, and the right-button signal input terminal 506, that is (1,1,0), the micro-controller 50 (MCU) outputs the scrolling-left signal to the host. Similarly, when the tile-wheel of a tilt-wheel mouse is tilted right by the user, the right-tilt-button switch (RTB) is at close position (ON) and the left-tilt-button switch (LTB) is at open position (OFF). It follows that a high-level signal, derived from the supply power (Vcc), is outputted to the middle-button signal input terminal 504 and the right-button signal input terminal 506 through the diodes D3 and D4, respectively, and a low-level signal is outputted to the left-button signal input terminal 502 through the diode D1. According to the level of the signals received by the left-button signal input terminal 502, the middle-button signal input terminal 504, and the right-button signal input terminal 506, that is (0,1,1), the micro-controller 50 (MCU) outputs the scrolling-right signal to the host.

However, both the situations, when the right-tilt-button switch (RTB) is pressed or the middle-button switch (MB) and the right-button switch (RB) are simultaneously pressed, will result in the micro-controller 50 (MCU) receives a signal of (0,1,1) from the left-button signal input terminal 502, the middle-button signal input terminal 504, and the right-button signal input terminal 506. Similarly, both the situations, when the left-tilt-button switch (LTB) is pressed or the left-button switch (LB) and the middle-button switch (MB) are simultaneously pressed, will result in the micro-controller 50 (MCU) receives a signal of (1,1,0) from the left-button signal input terminal 502, the middle-button signal input terminal 504, and the right-button signal input terminal 506. To prevent the micro-controller 50 (MCU) from misunderstanding the signals received by the left-button signal input terminal 502, the middle-button signal input terminal 504, and the right-button signal input terminal 506, an effective-duration is defined in firmware of the micro-controller 50 (MCU).

Generally, when users simultaneously press two buttons, say, the left-button and the middle-button, the left-button signal input terminal 502 and the middle-button signal input terminal 504 couldn't accurately receive the high-level signals at a same time point. In other words, there is a time difference, about over 100 ms, between the left-button signal input terminal 502 and the middle-button signal input terminal 504 receive the high-level signal after the user simultaneously pressing the left-button and the middle-button. On the contrarily, the left-button signal input terminal 502 and the middle-button signal input terminal 504 could receive the high-level signal almost at a same time point after users pressing the right-tilt-button switch (RTB). Therefore, the effective-duration can be used for determining the signals at the left-button signal input terminal 502, the middle-button signal input terminal 504, and the right-button signal input terminal 506 are actually from the left-middle-right button unit 22 or from the horizontal-scrolling button unit 42.

In the embodiment of the present invention, a 10 Hz sampling-frequency is adopted for detecting the level of signals at the left-button signal input terminal 502, the middle-button signal input terminal 504, and the right-button signal input terminal 506 within the effective-duration 100 ms. If the time difference, between the two time points of the middle-button signal input terminal 504 and the right-button signal input terminal 506 receiving the high-level signal, is greater than the effective-duration, the firmware in the micro-controller 50 (MCU) determines the high-level signals at the middle-button signal input terminal 504 and the right-button signal input terminal 506 are outputted from the middle-button (MB) and the right-button (RB), respectively. Then, the micro-controller 50 (MCU) will output the middle-button-pressed signal and the right-button-pressed signal instead of outputting the scrolling-right signal to the host.

On the contrarily, when the middle-button signal input terminal 504 and the right-button signal input terminal 506 receive the high-level signal, and the left-button signal input terminal 502 receives a low-level signal, and if the time difference, between the two time points of the middle-button signal input terminal 504 and the right-button signal input terminal 506 receiving the high-level signal, is less than the effective-duration, the firmware in the micro-controller 50 (MCU) determines the high-level signals at the middle-button signal input terminal 504 and the right-button signal input terminal 506 are outputted from the diodes D3 and D4, respectively. Therefore, the micro-controller 50 (MCU) will output the scrolling-right signal to the host.

Through the external-extend circuit 52 and the firmware within the micro-controller 50 (MCU), the tilt-wheel mouse can have extra functions of scrolling-left and scrolling-right without adding more I/O pins in the micro-controller 50 (MCU). Obviously, it is not limit to achieve the scrolling-left function through the left-button signal input terminal 502 and the middle-button signal input terminal 504 in the present invention, in other words, the scrolling-left function can be achieved through any set of I/O pins from the left-button signal input terminal 502, the middle-button signal input terminal 504, and the right-button signal input terminal 506. Similarly, it is not limit to achieve the scrolling-right function through the middle-button signal input terminal 504 and the right-button signal input terminal 506 in the present invention, in other words, the scrolling-right function can be achieved through any set of I/O pins from the left-button signal input terminal 502, the middle-button signal input terminal 504, and the right-button signal input terminal 506.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tilt-wheel mouse circuit, comprising:
a micro-controller, having a first input terminal, a second input terminal, and a third input terminal, for outputting a first-button-pressed signal, a second-button-pressed signal, a third-button-pressed signal, a scrolling-left signal, and a scrolling-right signal according to the level of signals at the first input terminal, the second input terminal, and the third input terminal;
a button unit, having a first-button switch, a second-button switch, and a third-button switch connected to the first input terminal, the second input terminal, the third input terminal respectively, for outputting a first-level signal or a second-level signal to the first input terminal, the second input terminal, the third input terminal, respectively;

a horizontal-scrolling button unit, having a first horizontal-scrolling switch and a second horizontal-scrolling switch, for outputting the first-level signal or the second-level signal; and an external-extend circuit, connected to the micro-controller and the horizontal-scrolling button unit, wherein the external-extend circuit can transmit the first-level signal or the second-level signal, derived from the first horizontal-scrolling switch, to the first input terminal and the second input terminal within an effective-duration; and the external-extend circuit can transmit the first-level signal or the second-level signal, derived from the second horizontal-scrolling switch, to the second input terminal and the third input terminal within the effective-duration;

wherein, the micro-controller outputs the scrolling-left signal when the first-level signal is asserted at the first input terminal and the second input terminal, and the second-level signal is asserted at the third input terminal, where a time difference, between the two time points of the first-level signal asserted at the first input terminal and the second input terminal, is less than the effective-duration; the micro-controller outputs the scrolling-right signal when the second-level signal is asserted at the first input terminal, and the first-level signal is asserted at the second input terminal and the third input terminal, where a time difference, between the two time points of the first-level signal asserted at the second input terminal and the third input terminal, is less than the effective-duration.

2. The tilt-wheel mouse circuit according to claim 1, wherein the micro-controller outputs the first-button-pressed signal when the first-level signal is asserted at the first input terminal, and the second-level signal is asserted at the second input terminal and the third input terminal; the micro-controller outputs the second-button-pressed signal when the first-level signal is asserted at the second input terminal, and the second-level signal is asserted at the first input terminal and the third input terminal; the micro-controller outputs the third-button-pressed signal when the first-level signal is asserted at the third input terminal, and the second-level signal is asserted at the first input terminal and the second input terminal; the micro-controller outputs both the first-button-pressed signal and the second-button-pressed signal when the first-level signal is asserted at the first input terminal and the second input terminal, and the second-level signal is asserted at the third input terminal, where the time difference, between the two time points of the first-level signal asserted at the first input terminal and the second input terminal, is greater than the effective-duration; and, the micro-controller outputs both the second-button-pressed signal and the third-button-pressed signal when the first-level signal is asserted at the second input terminal and the third input terminal, and the second-level signal is asserted at the first input terminal, where the time difference, between the two time points of the first-level signal asserted at the second input terminal and the third input terminal, is greater than the effective-duration.

3. The tilt-wheel mouse circuit according to claim 1, wherein the tilt-wheel mouse circuit further comprises:
a vertical-scrolling wheel unit, connected to the micro-controller, for outputting a scrolling-up signal and a scrolling-down signal.

4. The tilt-wheel mouse circuit according to claim 1, wherein the first-level signal is a high-level signal, and the second-level signal is a low-level signal.

5. The tilt-wheel mouse circuit according to claim 4, wherein the external-extend circuit further comprises: a first diode, a second diode, a third diode, and a fourth diode, the P terminals of the first diode and the second diode are together connected to the first horizontal-scrolling switch; the N terminals of the first diode and the second diode are connected to the first input terminal and the second input terminal, respectively; the P terminals of the third diode and the fourth diode are together connected to the second horizontal-scrolling switch; and the N terminals of the third diode and the fourth diode are connected to the second input terminal and the third input terminal, respectively.

6. The tilt-wheel mouse circuit according to claim 1, wherein the first-button switch is a left-button switch, the second-button switch is a middle-button switch, and the third-button switch is a right-button switch.

7. The tilt-wheel mouse circuit according to claim 1, wherein the first horizontal-scrolling switch is a left-tilt button switch, and the second horizontal-scrolling switch is a right-tilt button switch.

8. The tilt-wheel mouse circuit according to claim 1, wherein the tilt-wheel mouse circuit is applied to a laser mouse.

9. The tilt-wheel mouse circuit according to claim 1, wherein the tilt-wheel mouse circuit is applied to an optical mouse.

* * * * *